US011362586B1

(12) United States Patent
You et al.

(10) Patent No.: US 11,362,586 B1
(45) Date of Patent: Jun. 14, 2022

(54) POWER SUPPLY, FILTER CONTROL, AND DYNAMIC ADAPTIVE VOLTAGE POSITIONING

(71) Applicant: Infineon Technologies Austria AG, Villach (AT)

(72) Inventors: Zhiqing You, Torrance, CA (US); Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/215,951

(22) Filed: Mar. 29, 2021

(51) Int. Cl.
*G05F 1/00* (2006.01)
*H02M 3/155* (2006.01)
*H02M 1/44* (2007.01)

(52) U.S. Cl.
CPC ............ *H02M 3/155* (2013.01); *H02M 1/44* (2013.01)

(58) Field of Classification Search
CPC .. H02M 3/156; H02M 3/1588; H02M 3/1584; H02M 3/158; Y02B 70/1466
USPC ........................................................ 327/282
See application file for complete search history.

(56) References Cited

U.S. PATENT DOCUMENTS

| | | | | |
|---|---|---|---|---|
| 9,030,179 B2* | 5/2015 | Zhu | ........................ | H02M 3/156 323/280 |
| 10,673,336 B2* | 6/2020 | Jiang | ........................ | H02M 1/08 |
| 2007/0165427 A1* | 7/2007 | McDonald | ............ | H02M 3/156 363/41 |
| 2007/0236971 A1* | 10/2007 | Chen | .................... | H02M 3/1588 363/56.01 |
| 2011/0187341 A1* | 8/2011 | Chiu | ........................ | G05F 1/618 323/285 |
| 2014/0292300 A1* | 10/2014 | Yan | ........................ | H02M 3/156 323/288 |

* cited by examiner

*Primary Examiner* — Quan Tra
(74) *Attorney, Agent, or Firm* — Armis IP Law, LLC

(57) ABSTRACT

An apparatus includes a filter to receive a signal indicating a magnitude of current supplied by an output voltage to power a dynamic load. The filter produces a filtered signal from the received signal. A reference voltage generator generates a target setpoint voltage based on the filtered signal. The target setpoint voltage is used to control (such as regulate) a magnitude of the output voltage. The apparatus further includes a filter controller to dynamically change operational settings of the filter. For example, the filter controller reduces the bandwidth of filtering the signal in response to detecting that: i) the magnitude of the output voltage falls below an output voltage threshold value, and ii) the magnitude of a received VID value is greater than a VID threshold value.

33 Claims, 8 Drawing Sheets

POWER SUPPLY, FILTER CONTROL, AND DYNAMIC ADAPTIVE VOLTAGE POSITIONING

BACKGROUND

One type of conventional power converter is a buck converter. In general, to maintain an output voltage within a desired range, a controller in the buck converter compares the magnitude of a generated output voltage to a setpoint reference voltage. Based on a respective error voltage, the controller modifies a respective switching frequency and/or pulse width modulation associated with activating high side switch circuitry or low side switch circuitry in the buck converter.

In certain instances, the controller controls operation of the buck converter and generation of the output voltage based on an amount of output current supplied by a generated output voltage to a load. For example, conventional techniques include receiving a so-called VID (Voltage Identification) from a load such as a processor powered by the output voltage. The VID indicates a voltage setting associated with regulation of the output voltage. The controller of the buck converter adjusts a target setpoint voltage (Vtarget) based on the VID voltage setting, loadline function of the power supply, and the output current Iout supplied to the dynamic load (processor) such that:

$$V\text{target} = VID - I\text{out} \times \text{loadline} \quad \text{(equation 1)}$$

The controller of the power supply regulates a magnitude of the output voltage supplied to the load based on the target setpoint voltage, Vtarget.

So-called Active Voltage Positioning" (AVP) refers to setting the power supply output voltage at a set point reference voltage that is dependent on a magnitude of the load current. For example, at minimum load, the output voltage setting is set higher than a nominal voltage level. At full load, when the load consumes maximum current, the output voltage is set lower than the nominal voltage level. Effectively, the DC load regulation is degraded, but the load transient voltage deviation will be significantly improved.

BRIEF DESCRIPTION

Implementation of clean energy (or green technology) is very important to reduce our human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure further includes the observation that conventional techniques include setting an AVP bandwidth and applying same to any load step event as previously discussed. Implementation of a low AVP bandwidth helps fast Vmode load transient but hurts regular load transient with small duty cycle. In such an instance, it is required to add more output capacitors to the power supply to meet the specification of both fast Vmode load transient and regular load transient with different load frequency (300 Hz to 1 MHz) and load duty cycle (10% to 90%). Adding more output capacitors to a power supply is undesirable because it increases a size of the power supply and increases an overall cost to manufacture the power supply.

Embodiments herein include novel ways of providing improved performance of power conversion via implementation of filter control and adaptive voltage positioning.

More specifically, embodiments herein include an apparatus comprising a filter (such as a controllable filter), a reference voltage generator, and a filter controller. During operation, the filter receives a signal indicating a magnitude of current supplied by an output voltage to power a dynamic load. The filter produces a filtered signal from the received signal. The reference voltage generator generates a target setpoint voltage based on the filtered signal. The target setpoint voltage is used as a basis to control (regulate) a magnitude of the output voltage that powers the dynamic load. As discussed herein, the filter controller dynamically adjusts operational settings of the filter such as based on one or more monitored parameters such as a magnitude of the output voltage, a magnitude of the target setpoint voltage, or a combination of the magnitude of the output voltage and the magnitude of the target setpoint voltage.

Further embodiments herein include, via the filter controller, adjusting the operational settings of the filter based at least in part on a magnitude of the output voltage. Additionally, or alternatively, the filter controller adjusts the operational settings of the filter based on a change in a magnitude of the target setpoint voltage.

In yet further example embodiments, the filter controller as discussed herein includes a first comparator and a second comparator. The first comparator compares a magnitude of the output voltage to an output voltage threshold value. The second comparator compares a magnitude of a received VID value (such as received from the load or other suitable entity (CPU for example)) to a second threshold value. The operational settings (such as configuration settings) of the filter include a bandwidth of filtering the received signal (indicating a magnitude of the current supplied by the output voltage to the dynamic load). In one embodiment, the controller reduces the bandwidth of filtering the signal via the filter in response to detecting that: i) the magnitude of the output voltage crosses the output voltage threshold value (such as VTRIP threshold value value), and/or ii) the magnitude of the VID crosses a VID threshold value.

In further example embodiments, the filter is a low pass filter. The operational settings modified by the filter controller include a time constant of the low pass filter. In one embodiment, the controller increases a magnitude of the time constant of the low pass filter in response to a detected change in current consumption by the dynamic load. Further embodiments herein include, via control by the filter controller, at least temporarily reducing a rate at which the filtered signal changes over time via one or more filter adjustments during adaptive voltage positioning.

In still further example embodiments, the reference voltage generator produces the target setpoint voltage based on a voltage identification (VID) value supplied by the dynamic load or other suitable entity. In one embodiment, the target setpoint voltage, a.k.a. Vt, produced by the reference voltage generator equals: VID−(IoutF*LL), where VID=the voltage identification value such as produced by the dynamic load or other suitable entity, IoutF=a magnitude of the filtered signal, and LL=a Load-Line value (such as in ohms) derived from a load-line function associated with a voltage converter operative to convert the input voltage into the output voltage.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: filter a received signal indicating a magnitude of current supplied by an output voltage to power a dynamic load; generate a target setpoint voltage based on the filtered signal, the target setpoint voltage used to control a magnitude of the output voltage; and dynamically change operational settings of filtering the received signal via the filter.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary of embodiments) and corresponding figures of the present disclosure as further discussed below.

Figure 1:
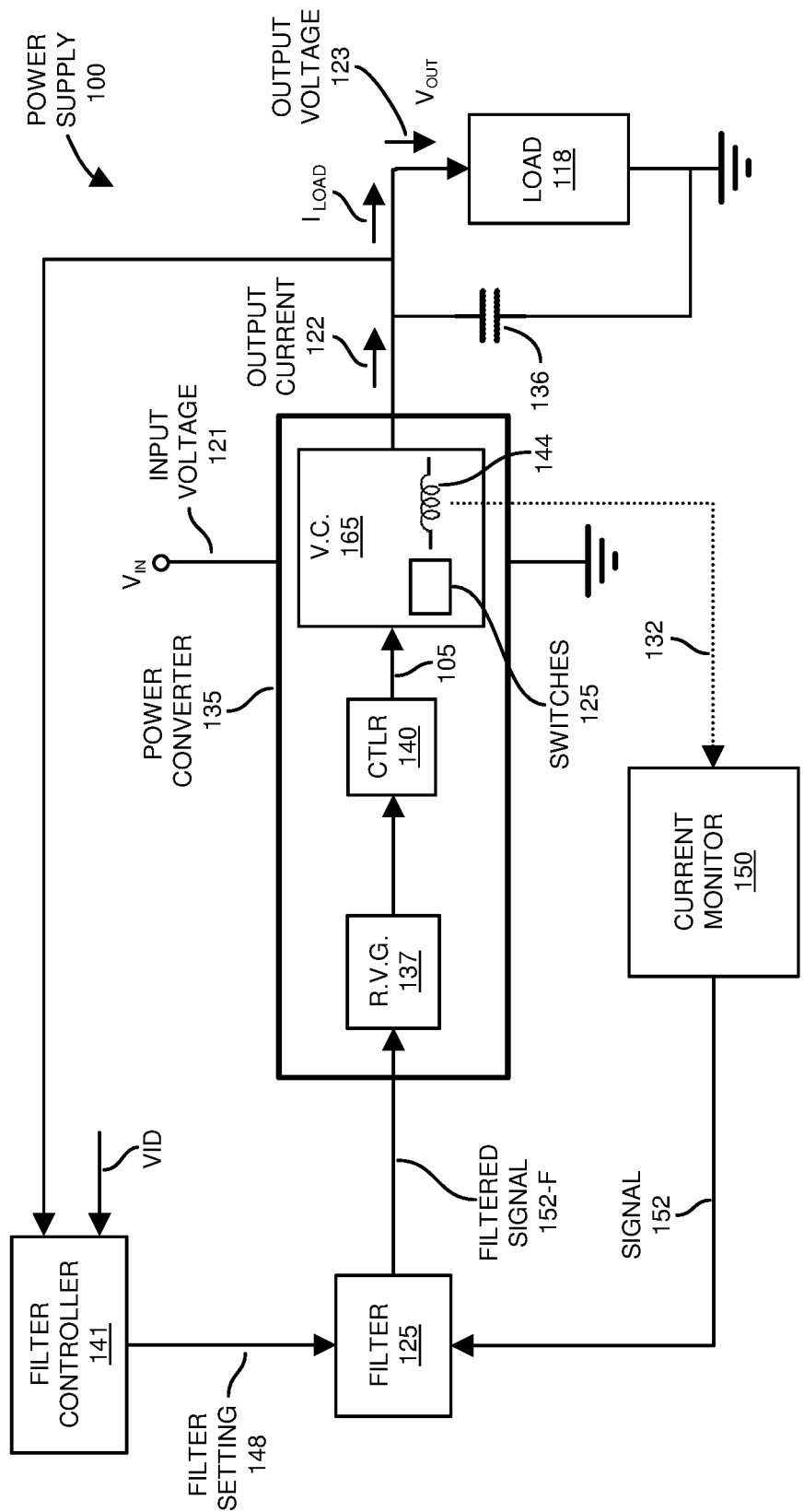
FIG. 1 is an example general diagram of a power supply supplying current through an inductance (one or more inductor) of a switched power supply to a dynamic load according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include an apparatus comprising a filter to receive a signal indicating a magnitude of current supplied by an output voltage to power a dynamic load. The filter produces a filtered signal from the received signal. A reference voltage generator generates a target setpoint voltage based on the filtered signal. The target setpoint voltage is used as a basis to control (such as regulate) a magnitude of the output voltage.

The apparatus further includes a filter controller to dynamically change operational settings of the filter. For example, in one nonlimiting example embodiment, the filter controller reduces the bandwidth, cutoff frequency, etc., of filtering the signal in response to detecting one or more condition such as that: i) the magnitude of the output voltage falls below an output voltage threshold value, and ii) the magnitude of a received VID value (such as from the load or other suitable entity) is greater than a second threshold value.

Now, more specifically, FIG. 1 is an example general diagram of a power supply and corresponding components according to embodiments herein.

In this example embodiment, the power supply 100 includes power converter 135, current monitor 150, filter 125, and filter controller 141.

Power converter 135 includes reference voltage generator 137, controller 140, and voltage converter 165. Voltage converter 165 includes switches 125 and inductance such as one or more inductive devices 144.

During operation, via control of switches 125, the voltage converter 165 converts the received input voltage 121 into the output voltage 123. The output voltage 123 and corresponding generated output current 122 (i.e., $I_{LOAD}$) supply power to the dynamic load 118 and capacitors 136.

As further shown, current monitor 150 receives one or more signals 132 such as feedback signals associated with the voltage converter 165. Via the one or more signals 132, in one embodiment, the output current measurement 150 physically measures and/or estimates the output current 122 supplied through the inductor 144 to the combination of capacitor 136 and the dynamic load 118.

More specifically, based on the feedback signals 132, the current monitor 150 produces current sense signal 152 (i.e., inductor output current information) indicating a magnitude of the output current 122 supplied by the output voltage 123 to the load 118 and capacitors 136.

Note that the current monitor 150 (such as output current measurement resource) includes any suitable circuitry to monitor an amount of current through the inductor 144.

For example, in one embodiment, the current monitor 150 is or includes one or more analog-to-digital converters to measure a voltage across a resistive element (such as resistive element inherent in the inductor 144 itself or a separate component) in the power converter through which the inductor output current 122 flows.

As a further non-limiting example embodiment, the current monitor 150 can be configured to include one or more analog-to-digital converters and/or corresponding circuitry that produces the actual sample measurements of the output current 122. This can include a technique such as measuring the voltage across the inductor 144 of the corresponding voltage converter 165 and implementing so-called DCR measurements to detect the output current 122.

Alternatively, as mentioned, embodiments herein include monitoring a voltage of a resistive element such as an $R_{DSON}$ (resistance of high side switch circuitry and/or low side switch circuitry between the drain and source nodes) through which the output current 122 flows when the low side switch circuitry is ON.

Yet further embodiments include determining a magnitude of the output current 122 via current mirroring techniques.

Thus, any suitable type of measurements and/or estimations can be implemented to detect or determine a magnitude or change in magnitude of the output current 122 through the inductor 144.

As further shown, current monitor 150 supplies generated signal 152 (indicating a magnitude of the output current 122 through the inductor 144) to the input of the filter 125. As its name suggests, the filter 125 filters the received signal 152 and produces the filtered signal 152-F supplied to the reference voltage generator 137 (implementing an adaptive voltage positioning function based on load-line and current consumption by the dynamic load 118).

Filter controller 141 produces filter setting 148 applied to the filter 125. The filter setting 140 controls a degree (such as bandwidth, frequency, time constant, etc.) of filtering the received signal 152 and generating the filtered signal 152-F.

In one embodiment, the filter controller 141 produces the filter setting 148 based upon one or more of the magnitude of the output voltage 123 and/or a VID value received from the dynamic load 118 (such as CPU) or other suitable entity in the power supply 100. In general, the VID value indicates a voltage at which to regulate the output voltage 123.

As further shown, the power supply 100 as discussed herein includes a switch controller 140. As its name suggests, the switch controller 140 controls switching of the switches 125 to convert the input voltage 121 into the output voltage 123.

Thus, embodiments herein include an apparatus comprising a filter 125 (such as a controllable filter), a reference voltage generator 137, and a filter controller 141. The filter 125 receives a signal 152 indicating a magnitude of current 122 supplied by an inductor 144 to power a dynamic load 118. The filter 125 produces a filtered signal 152-F from the received signal 152.

The reference voltage generator 137 generates a target setpoint voltage 145 based on the filtered signal 152-F.

In one embodiment, the target setpoint voltage 145 is also used to control (regulate) a magnitude of the output voltage 123 that powers the dynamic load 118.

As previously discussed, the filter controller 141 dynamically adjusts operational settings of the filter 125 such as based on one or more monitored parameters such as a magnitude of the output voltage 123, a magnitude of the target setpoint voltage 145, a combination of the magnitude of the output voltage 123 and the magnitude of the VID value from LOAD 118 or other suitable entity, and so on.

Figure 2:
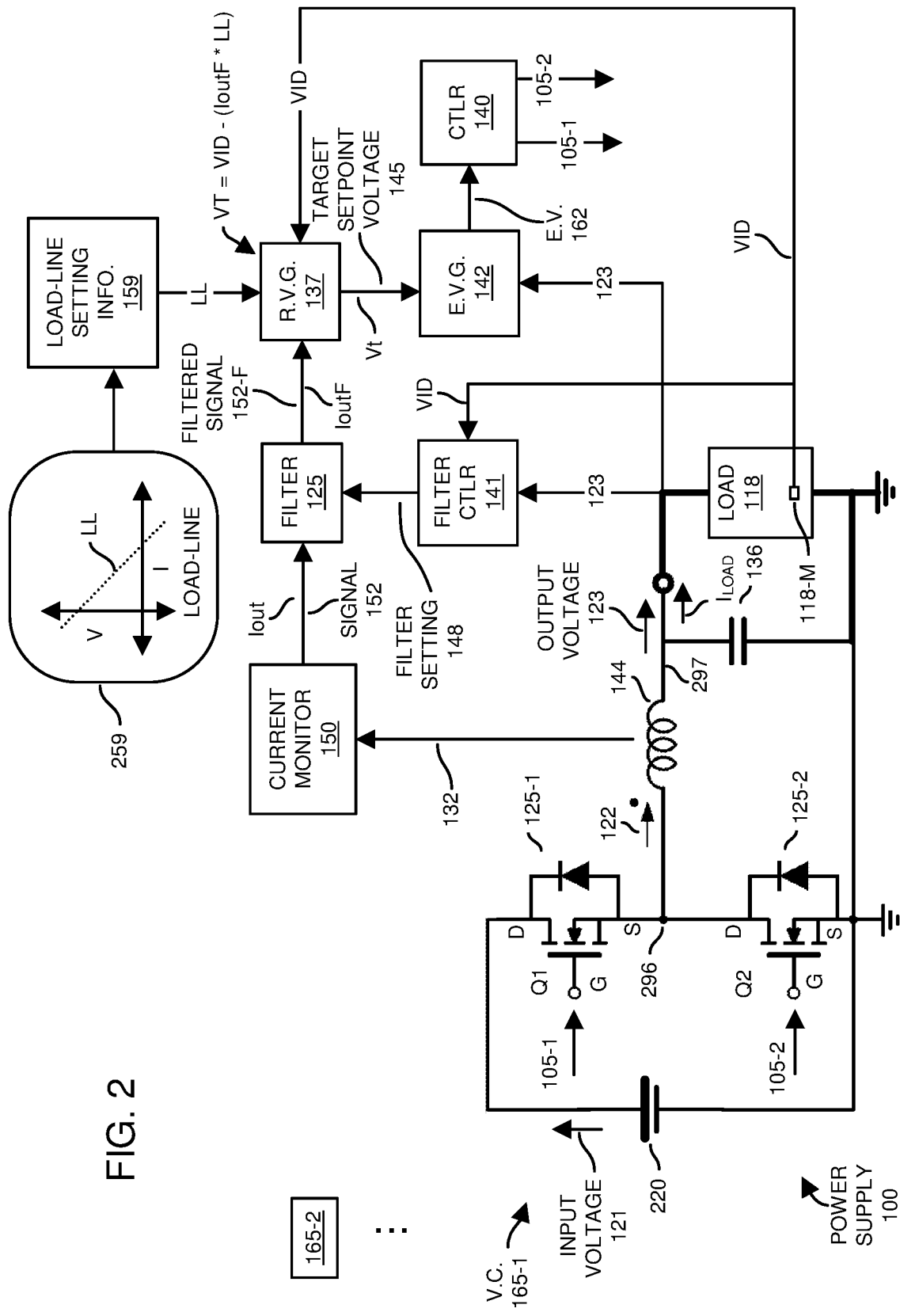
FIG. 2 is an example diagram illustrating operation of a power converter and implementation of filter control according to embodiments herein.

A more detailed non-limiting example embodiment of implementing and controlling switches 125 in a power supply 100 and control of filter 125 is shown and discussed in FIG. 2.

FIG. 2 is an example diagram illustrating operation of a power converter and implementation of filter control according to embodiments herein.

In this non-limiting example embodiment, the voltage converter 165-1 is configured as a buck converter including voltage source 220 (providing input voltage 121), switch Q1, switch Q2, inductor 144, and output capacitor 136 (such as one or more capacitors).

Note that the power supply 100 can include any number of voltage converters that operate in parallel to produce the corresponding output voltage 123. Each voltage converter operates in a similar manner as voltage converter 165-1.

Although the voltage converter 165-1 in FIG. 2 is shown as a buck converter configuration, note again that the voltage converter 165 can be instantiated as any suitable type of voltage converter and include any number of phases, providing regulation of a respective output voltage 123 as described herein.

As further shown in this example embodiment, the switch Q1 of voltage converter 165-1 is connected in series with switch Q2 between the input voltage 121 and corresponding ground reference.

For example, the drain node (D) of the switch Q1 is connected to the voltage source 220 to receive input voltage 121. The switch controller 140 drives the gate node (G) of switch Q1 with control signal 105-1 to turn the switch Q1 ON and OFF.

The source node (S) of the switch Q1 is connected to the drain node (D) of the switch Q2 at node 296. The switch controller 140 drives the gate node (G) of switch Q2 with control signal 105-2. The source node (S) of the switch Q2 is connected to ground.

As previously discussed, the voltage converter 165 further includes inductor 144. Inductor 144 extends (e.g., is connected) from the node 296 to the output capacitor 136 and dynamic load 118.

Via switching of the switches Q1 and Q2 based on respective control signal 105-1 (applied to gate G of switch Q1) and control signal 105-2 (applied to gate G of switch Q2), node 296 coupling the source (S) node of switch Q1 and the drain (D) node of switch Q2 provides output current 122 through the inductor 144, resulting in generation of the output voltage 123 and corresponding output current $I_{LOAD}$ powering the load 118 and energizing capacitors 136.

In general, the magnitude of the current $I_{LOAD}$ is approximately equal to a magnitude of the output current 122 through inductor 144. Via one or more signals 132, the current monitor 150 measures output current 122 through the inductor 144. Signal 152 represents a magnitude of current through the inductor 144.

As previously discussed, the filter 125 receives signal 152 (i.e., Iout). Based upon filtering applied by filter 125 as indicated by the filter setting 148 generated by the filter controller 141, the filter 125 produces the filtered signal 152-F (IoutF).

The reference voltage generator 137 receives multiple inputs such as the filtered signal 152-F, load line setting information 159 (such as LL), and VID (Voltage Identification) value received from the dynamic load 118.

In one embodiment, the dynamic load 118 includes dynamic load manager 118-M. The dynamic load manager 118-M or other suitable entity produces a respective voltage identification value VID (codes or commands) supplied to the reference voltage generator 137.

The load line setting information 159 (a.k.a., LL) indicates attributes associated with operating the power supply 100 in accordance with adaptive voltage positioning. For example, in one embodiment, the load line setting information 159 is an impedance value assigned to the voltage converter 165-1. As further discussed below, the reference voltage generator 137 uses the load line setting information 159 as a basis to generate the target setpoint voltage 145.

More specifically, in this nonlimiting example embodiment, the reference voltage generator 137 produces (via implementation of an adaptive voltage positioning function) the target setpoint voltage 145 based on one or more voltage identification values VID supplied by the dynamic load 118 or other suitable entity. In one embodiment, the target setpoint voltage 145, a.k.a., Vt, produced by the reference voltage generator 137 equals: VID−(IoutF*LL), where VID=the voltage identification VID value receives from the dynamic load 118 or other suitable entity, IoutF=a magnitude of the filtered signal 152-F, and LL=a Load-Line value (such as a value or setting in milliohms) derived from the load-line function 259 (a.k.a., LL) associated with the voltage converter 165-1.

In one embodiment, the load-line setting information 159 is supplied via respective operator and programmed into the power supply 100.

The reference voltage generator 137 outputs the target setpoint voltage 145 to the error voltage generator 142. The error voltage generator 142 uses the received target setpoint voltage 145 as a basis in which to regulate the magnitude of the output voltage 123.

For example, in one embodiment, the controller 140 controls switching of the switches Q1 and Q2 based on one or more feedback parameters. For example, the error voltage generator 137 receives output voltage feedback signal 123. The received feedback may be the output voltage 123 itself or a voltage derived from the output voltage 123 supplied to power the dynamic load 118 as previously discussed in FIG. 1. Referring again to FIG. 2, the output voltage feedback signal received by the error voltage generator 142 can be generated using a resistor divider in which the output current 123 is divided into a suitable value depending on settings output of the resistor divider.

In further example embodiments, the error voltage generator 142 (such as implementing a comparator) produces a respective error voltage 162 based on the difference between the output voltage 123 (or output voltage feedback signal) and the target setpoint voltage 145 (such as reference voltage). A magnitude of the error voltage 162 generated by the error voltage generator 142 varies depending upon the degree to which the magnitude of the output voltage 123 is in or out of regulation (with respect to the target setpoint voltage 145).

As further shown, the controller 140 controls operation of switching the switches Q1 and Q2 based upon the magnitude of the error voltage 162.

For example, if the error voltage 162 indicates that the output voltage 123 (of the voltage converter 165-1) becomes less than a magnitude of the target setpoint voltage 145, the controller 140 increases a duty cycle or frequency of activating the high side switch Q1 (thus decreasing a duty cycle of activating the low-side switch Q2) in a respective switch control cycle.

Conversely, if the error voltage 255 indicates that the output voltage 123 (of the voltage converter 165-1) becomes greater than a magnitude of the target setpoint voltage 145, the controller 140 decreases a duty cycle or frequency of activating the high side switch Q1 (thus increasing a duty cycle of activating the low-side switch Q2) in a respective switching control cycle.

As is known in the art, the controller 140 controls each of the switches Q1 and Q2 ON and OFF at different times to prevent short-circuiting of the input voltage 121 to the ground reference voltage. For example, for a first portion of the control cycle, when the switch Q1 is activated to an ON state, the switch Q2 is deactivated to an OFF state. Conversely, when the switch Q1 is deactivated to an OFF state, the switch Q2 is activated to an ON state.

Note that the controller 140 implements a dead time (both switches Q1 and Q2 OFF) between state ON-OFF and OFF-ON state transitions to prevent shorting of the input voltage 121 to the ground reference.

Via variations in the pulse with modulation (and/or frequency modulation) of controlling the respective switches Q1 and Q2, the controller 140 controls generation of the output voltage 123 such that the output voltage 123 remains within a desired voltage range with respect to the reference voltage setpoint 235.

As previously discussed, the dynamic load 118-M or other suitable entity outputs the VID value to the filter controller 141 as well as the reference voltage generator 137. In one embodiment, the filter controller 141 uses the received VID from dynamic load 118 (or other suitable entity) and the magnitude of the output voltage 123 as a basis in which to control filter setting 148 applied to the filter 125.

More specifically, in one embodiment, the power supply 100 operates in a so-called adaptive voltage positioning (AVP) mode. For example, in accordance with the load-line setting information 259, and implementation of adaptive voltage positioning, the reference voltage generator 137 adjusts a magnitude of the target setpoint voltage 145 to a higher voltage when the output current 122 consumed by the dynamic load 118 is very low (such as below 10 Amps or other suitable value); the reference voltage generator 137 adjusts a magnitude of the target setpoint voltage 145 to a lower voltage when the output current 122 consumed by the dynamic load 118 is very high (such as greater than 50 Amps or other suitable value).

The following drawings illustrate implementation of different control signals and a magnitude of the inductor output current 122 during adaptive voltage positioning operation of the power supply 100 over time.

To produce the output voltage 123, the controller 140 produces control signals 105 (control signal 105-1 and control signal 105-2) using a selected switching frequency. As previously discussed, the monitor 150 determines a magnitude of output current 122 through inductor 144 and produces the signal 152 indicating the magnitude.

The magnitude of current 122 through the inductor 144 increases when the high-side switch Q1 is ON and switch Q2 is OFF; the magnitude of current 122 through the inductor 144 decreases when the high-side switch Q1 is OFF and Q2 is ON. The filter 125 provides different degrees of filtering of the received signal 152 depending on input filter setting 148 received from the filter controller 141.

Figure 3:
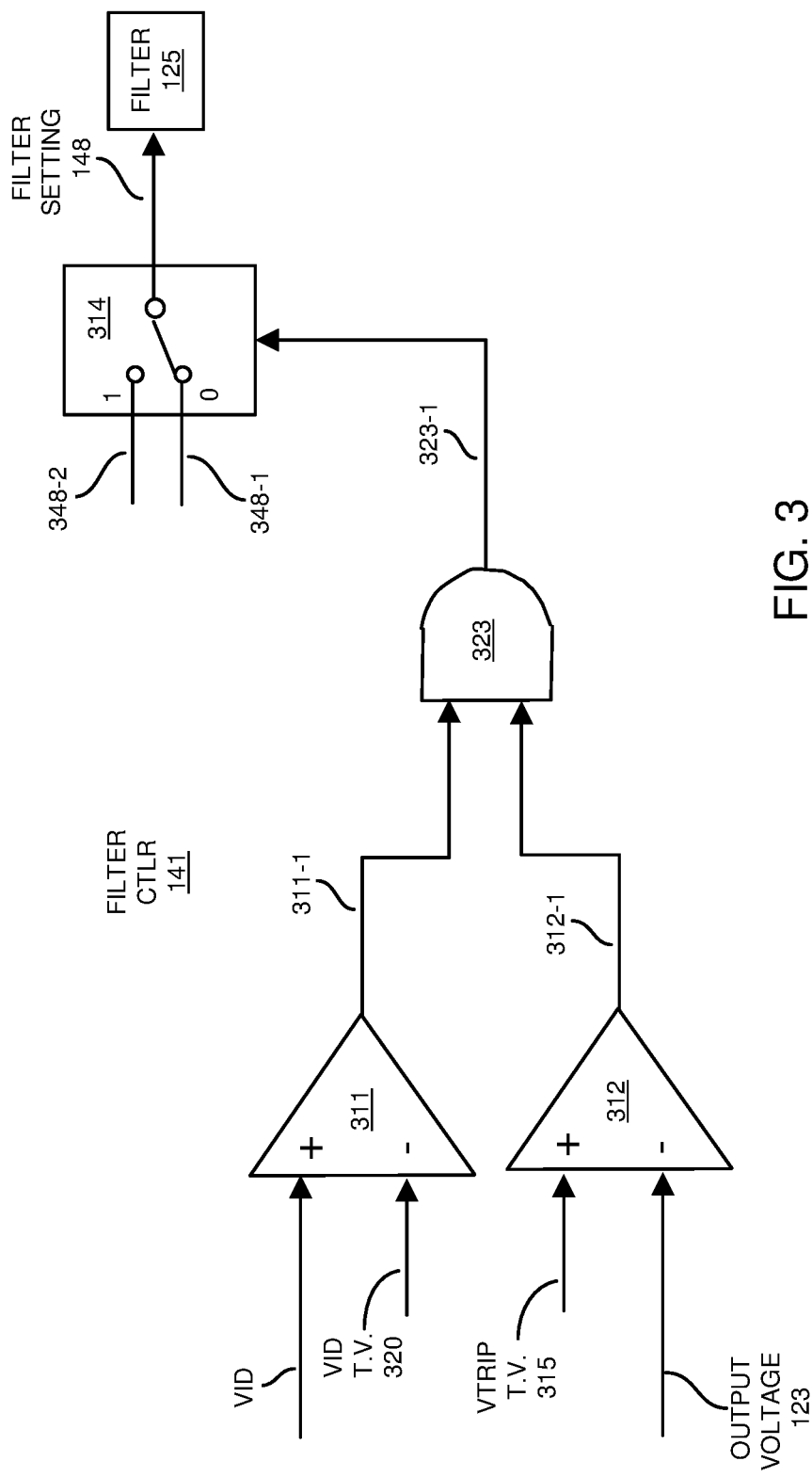
FIG. 3 is an example diagram illustrating a filter controller according to embodiments herein.

FIG. 3 is an example diagram illustrating a filter controller according to embodiments herein.

In this example embodiment, the filter controller 141 includes comparator 311, comparator 312, logic 323 (such as an AND gate), and multiplexer 314.

As shown, the comparator 311 compares the VID value received from the dynamic LOAD 118 to the VID threshold value 320 (a.k.a., a preset VID threshold value. In one embodiment, the filter controller 141 receives the VID threshold value 320 from the dynamic load 118-M or other suitable entity in a manner as previously discussed.

Based on the comparison, the comparator 311 produces the compare signal 311-1 indicating whether or not the VID threshold 320 preset by the user operating power supply 100 is above or below the VID value received from the dynamic load 118 or other suitable entity. For example, when the VID value received from LOAD 118 is greater than the VID threshold value 320 (preset VID value such as received from the dynamic load 118 or other suitable entity), the output signal 311-1 from the comparator 311 is set to a logic high.

Conversely, when the VID value received from dynamic load 118 is below the VID threshold value 320 (preset VID threshold value), the comparator 311 produces the compare signal 311-1 to be logic low.

Additionally, the comparator 312 compares the magnitude of the output voltage 123 to the VTRIP threshold value 315 (such as a programmed value supplied during programming of the power supply 100). Based on the comparison, the comparator 312 produces the compare signal 312-1 indicating whether or not the output voltage 123 is above or below the VTRIP threshold value 315. For example, when the output voltage 123 is less than the VTRIP threshold value 315, the output signal 312-1 from the comparator 312 is set to a logic high. Conversely, when the output voltage 123 is above the VTRIP threshold value 315, the comparator 312 produces the compare signal 312-1 to be logic low.

In further example embodiments, the filter controller 141 includes AND logic 323. The AND logic 323 receives signal 311-1 and signal 312-1. The AND logic 323 produces control signal through the 323-1 and supplies it to the multiplexer 314.

Depending on a state of the control signal 323-1, the multiplexer 314 switches between selecting filter setting 348-1 and filter setting 348-2 to produce filter setting 148 supplied (applied) to control operation of the filter 125. For example, in this non-limiting example embodiment, when the output signal 323-1 from the AND logic 323 is a logic low (zero), the mux 314 sets filter setting information 148 to the first filter setting 348-1 such as a default mode setting. When the control signal 323-1 from the AND logic 323 is a logic high (one), the mux 314 sets filter setting information 148 to the second filter setting 348-2.

As further discussed herein, note that the filter settings specified by the filter setting 348-1, 348-2, etc., indicate any suitable one or more parameters in which to control the filter 125 (such as a low pass filter, bandpass filter, time constants, etc.).

In one embodiment, the filter setting information 348-1 indicates one or more of a respective bandwidth, cutoff frequency, time constant TC1, etc., that is to be implemented by the filter 125 to filter the received signal 152 (Iout) during non-transient current conditions.

The filter setting information 348-2 also indicates a respective one or more of a bandwidth, cutoff frequency, time constant TC2, etc., that is to be implemented by the filter 125 to filter the received signal 152 (Iout) during transient current conditions.

As further discussed herein, adjustment of the filter 125 and corresponding filter setting 148 controls a degree to which the magnitude of the signal 152-F changes over time with respect to the signal 152.

In one embodiment, the filter setting 348-1 indicates a cutoff frequency of 75 kilohertz, or time constant TC1, or other suitable values. The filter setting 348-2 indicates a cutoff frequency of 25 kilohertz, or time constant TC2, or other suitable values.

Thus, embodiments herein include, via the filter controller 141, adjusting the operational settings of the filter 125 based on a magnitude of the output voltage 123. Additionally, or alternatively, the filter controller 141 adjusts the operational settings of the filter 125 based on a change in a magnitude of the one or more VID values received from the dynamic load 118 or other suitable entity. In other words, the VID value serves as an input to the comparator 311. As previously discussed, the filter controller 141 includes a first comparator 311 and a second comparator 312. The comparator 311 compares a magnitude of the VID value received from the dynamic load 118 or other suitable entity to a VID threshold 320 preset by the user associated with the power supply 100. The comparator 312 compares a magnitude of the output voltage 123 to an output voltage threshold value (such as VTRIP threshold value 315).

In one embodiment, as previously discussed, the operational settings (configuration settings) of the filter 125 include settings such as a bandwidth of filtering the received signal 152 (indicating a magnitude of the current 122 supplied by the output voltage 123 to the dynamic load 118). The controller 141 reduces the bandwidth of filtering the signal 152 via the filter 125 in response to detecting of signal 311-1 and signal 312-1 both being logic high such as when: i) the magnitude of the output voltage 123 crosses the output voltage threshold value 315 (VTRIP), and ii) the magnitude of the VID value from the dynamic load 118 crosses the VID threshold value 320.

In further example embodiments, a so-called "Min fast Vmode VID thresh1" (a.k.a., VID threshold value 320) is a VID command code threshold value received from the dynamic load manager 118-M (such as a Central Processing Unit or CPU) or other suitable entity. When the power supply 100 is operating, the dynamic load 118 sends different VID command codes to the reference voltage generator 137 of the voltage converter 165. As discussed herein, the voltage converter 165 uses the VID values to produce the output voltage 123. For example, as previously discussed, the voltage converter 165 produces the output voltage 123 as indicated by Vt=VID−Iout*loadline). Thus, the output voltage 123 generally equals Vt during steady state. In one embodiment, the VID value such as command code falls within a range such as 1.6 VDC to 2 VDC, although this varies depending upon the application.

Additionally, as previously discussed, embodiments herein include setting the so-called "Min fast Vmode VID threshold1" (a.k.a., VID threshold value 320) to be 1.7 VDC or other suitable value, which means the switchover to application of the filter settings 348-2 to filter 125 won't be activated if the voltage converter 165 receives a VID value (command) below 1.7 VDC from the dynamic load manager 118-M (such as CPU), which is 1.6V to 1.7V in this case. If the dynamic load 118 sends a VID value above 1.7 VDC (the VID threshold value 320), then the filter controller 141 activates the second settings 348-2 once the absolute sensed output voltage 123 (Vout) is also less than the threshold value 315 (VTRIP).

In one embodiment, the threshold value 315 is a fixed voltage threshold level in which to compare to the absolute sensed output voltage 123, which is controlled via the setpoint VID−Iout*loadline.

Figure 4:
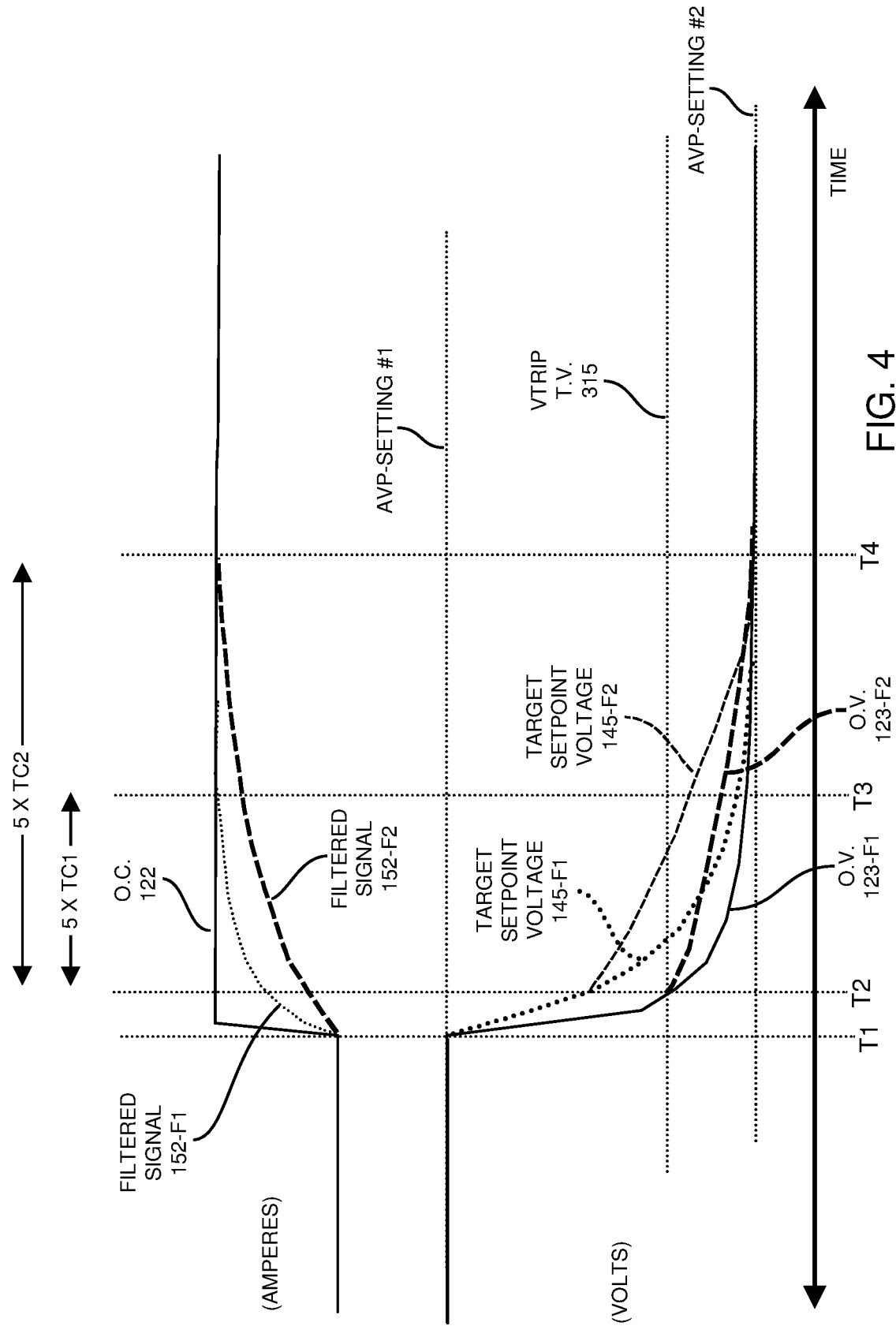
FIG. 4 is an example timing diagram illustrating filter control during adaptive voltage positioning according to embodiments herein.

FIG. 4 is an example timing diagram illustrating dynamic filter control during adaptive voltage positioning according to embodiments herein.

In this example embodiment, assume that the power supply 100 produces the output voltage 123 at a first voltage setting AVP-SETTING #1 (target setpoint voltage 145) prior to time T1 because the output current 122 is low such as below 10 Amps or other suitable value.

At time T1, the dynamic load 118 suddenly consumes more current 122 such as above 50 Amps or other suitable value. In such an instance, the reference voltage generator 137 adjusts the magnitude of the target setpoint voltage 145. However, recall that the adjustment to the target setpoint voltage 137 does not immediately change because the reference voltage generator 137 derives the target setpoint voltage 145 from the filtered signal 152-F and not signal 152. Filtered signal 152-F is slower to change than the signal 152.

With reference to FIG. 3 and FIG. 4, assume that the filter controller 141 does not operate in a dynamic filter mode in which settings of the filter 125 are adjusted. In such an embodiment, the filter controller 141 implements filter settings 348-1 all of the time such as both before and after time T2. In such an embodiment, the filter 125 produces filtered signal 152-F1; the reference voltage generator 137 produces the target setpoint voltage 145-F1. The voltage converter 165 produces output voltage 123-F1, which falls quickly and is susceptible to an undervoltage condition, causing the dynamic load 118 to reset.

In contrast, assume in another embodiment that the filter controller 141 does operate in a dynamic filter mode in which settings of the filter 125 are adjusted during adaptive voltage positioning. In such an embodiment, the filter controller 141 implements filter settings 348-1 before time T2. At time T2, a trigger event occurs such as when the compare signal 311-1 is a logic high because the VID value received from the dynamic load 118 is greater than the VID threshold value 320 and the compare signal 312-1 is a logic high because the output voltage 123-F2 is less than the VTRIP threshold value 315. The AND logic 323 thus switches at time T2 from producing the signal 323-1 from a logic low to a logic high. This causes the multiplexer 314 to switch from implementing filter settings 348-1 to implementing filter settings 348-2. The filter controller 141 applies the second filter settings 348-2 to the filter while compare signal 323-1 is a logic one. The result of dynamically switching the filter settings results in a greater amount of filtering, via filter 125, the received signal 152 to produce the filtered signal 152-F2. See a comparison of signal 152-F1 (fast response) and signal 152-F2 (slow response)

The difference in filtering is illustrated by implementation of filtered signal 152-F1 (with no change in filtering by filter 125) and implementation filtered signal 152-F2 (with a change in filtering by filter 125 from settings 348-1 to filter settings 348-2).

In one embodiment, the filter 125 is a low pass filter. If desired, the operational settings modified by the filter controller 141 can include adjustment of a time constant of the low pass filter during implementation of adaptive voltage positioning. For example, in one embodiment, the filter controller 141 increases a magnitude of the time constant of the filter 125 in response to a detected change in current 122 consumption by the dynamic load 118. Thus, embodiments herein include, via the filter controller 141, at least temporarily reducing a rate at which the filtered signal 152-F2 changes over time based on changes to the filter setting 148 applied to the filter 125 (such as analog or digital filter).

As further shown in FIG. 4, implementation of different filter settings such as different time constants depend on a state of the control signal 323-1 outputted from the AND logic 323. For example, the filter controller 141 sets the filter 125 to operate at a first time constant TC1 when implementing the first filter settings 348-1. Implementation of the first time constant TC1 is shown via filtered signal 152-F1 (static adaptive voltage positioning mode). In such an instance, after passing of time equivalent to 5 time constants TC1, as measured between time T2 and time T3, the filtered signal 152-F1 substantially reaches the actual magnitude of the output current 122.

As previously discussed, the filter controller 141 sets the filter 125 to operate at a second time constant TC2 when implementing the second filter settings 348-2 during an adaptive voltage positioning transition. Implementation of the second time constant TC2 is shown via filtered signal 152-F2. The filter settings 148-2 are applied to the filter 125 at time T2. In such an instance, after passing of 5 second time constants, as measured between time T2 and time T4, the filtered signal 152-F2 substantially reaches the actual magnitude of the output current 122.

This comparison illustrates how changing the filter settings in the dynamic adaptive voltage positioning mode results in slowing a response output of generating the output voltage 123 during the detected adaptive voltage positioning transition at or around time T1 and T2.

Thus, implementation of the second filter settings 348-2 (such as time constant TC2 instead of time constant TC1 associated with filter settings 348-1), slows the adaptive voltage positioning filter 125 and rate of decreasing the target setpoint voltage 145 such that the output voltage 123 does not fall below a respective minimum threshold value during the transition when the dynamic load 118 suddenly consumes much more current 122 at or around time T1 and T2.

Figure 5:
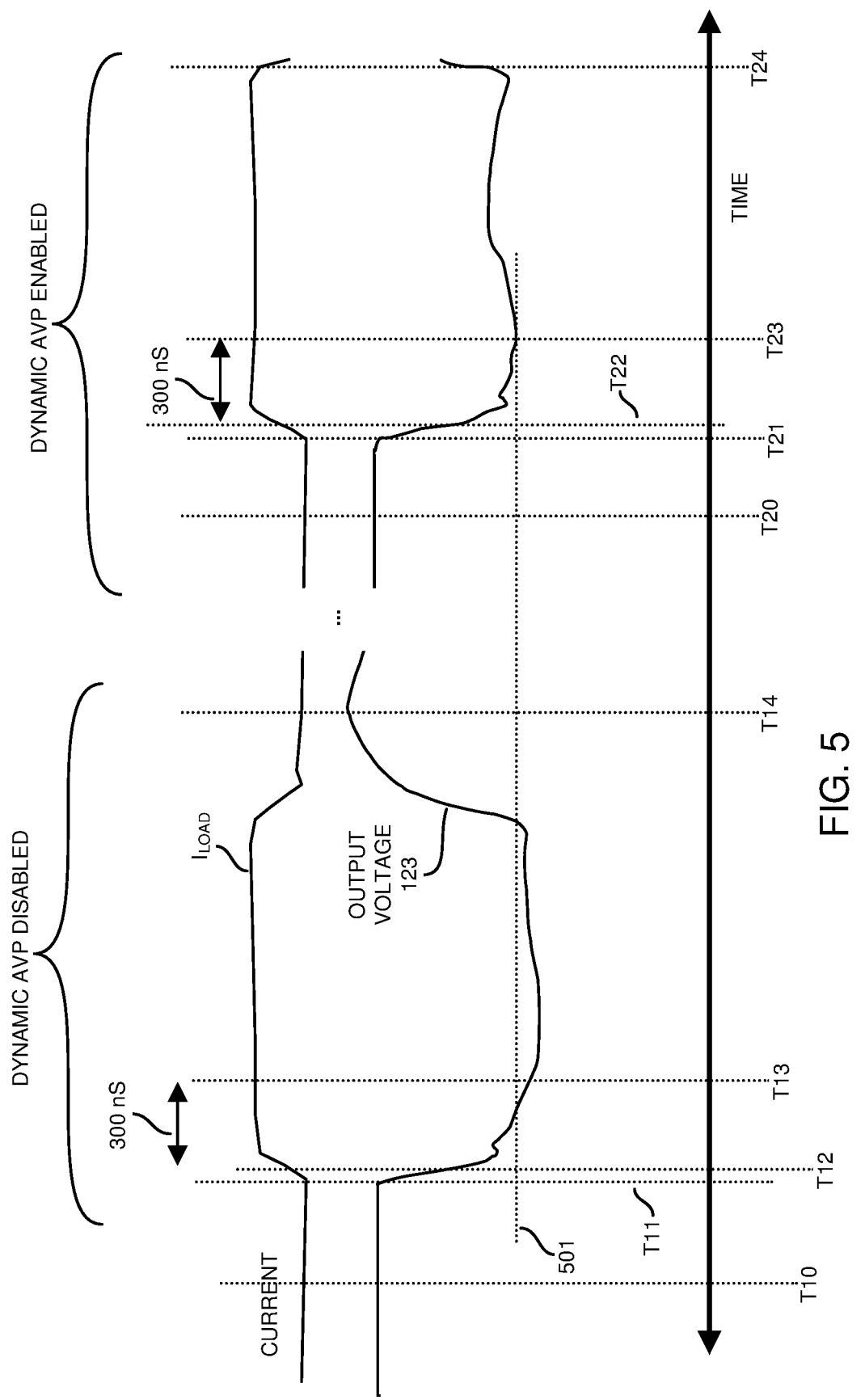
FIG. 5 is an example timing diagram illustrating a side-by-side difference between implementing adaptive voltage positioning with and without filter adjustments according to embodiments herein.

FIG. 5 is an example timing diagram illustrating a difference between implementing adaptive voltage positioning with and without filter adjustments according to embodiments herein.

Timing diagram 500 illustrates a side by side comparison of implementing static adaptive voltage positioning filter settings (between time T10 and T14) and dynamic adaptive voltage positioning filter settings (between time T20 and T24).

More specifically, in this example embodiment, assume that the filter controller 141 applies filter settings 348-1 (and time constant TC1) between time T10 and time T14 even though there is an adaptive voltage positioning voltage transition. For example, at time T11, the dynamic load experiences a sudden increase in consuming current 122 (such as adaptive voltage positioning trigger event). In a manner as previously discussed, this causes the output voltage 123 to drop. In this instance of implementing the same filter settings 348-1 between time T10 and T14, the output voltage 123 falls below the threshold value 501. Falling below the threshold value 501 causes the respective dynamic load 118 to be reset. This is undesirable because reset of the dynamic load 118 (such as CPU).

The filter controller 141 dynamically applies filter settings 348-1 and filter settings 348-2 between time T20 and time T24 during which there is an adaptive voltage positioning voltage transition. For example, at around time T21, the dynamic load 118 experiences a sudden increase in consuming current 122. In a manner as previously discussed, this causes the output voltage 123 to drop. In this instance, the filter controller implements filter settings 348-1 between time T20 and time T22. At the trigger event such as around time T22, the filter controller 141 switches to applying filter settings 348-2 (and time constant TC2 instead of time constant TC1) to the filter 125. The output voltage 123 falls, but not below the threshold value 501 because of the change to the filler settings 348-2. This prevents the reset condition that otherwise occurred between time T12 and T13. This is desirable because it prevents reset of the dynamic load 118 (such as CPU) during the adaptive voltage positioning transition.

Figure 6:
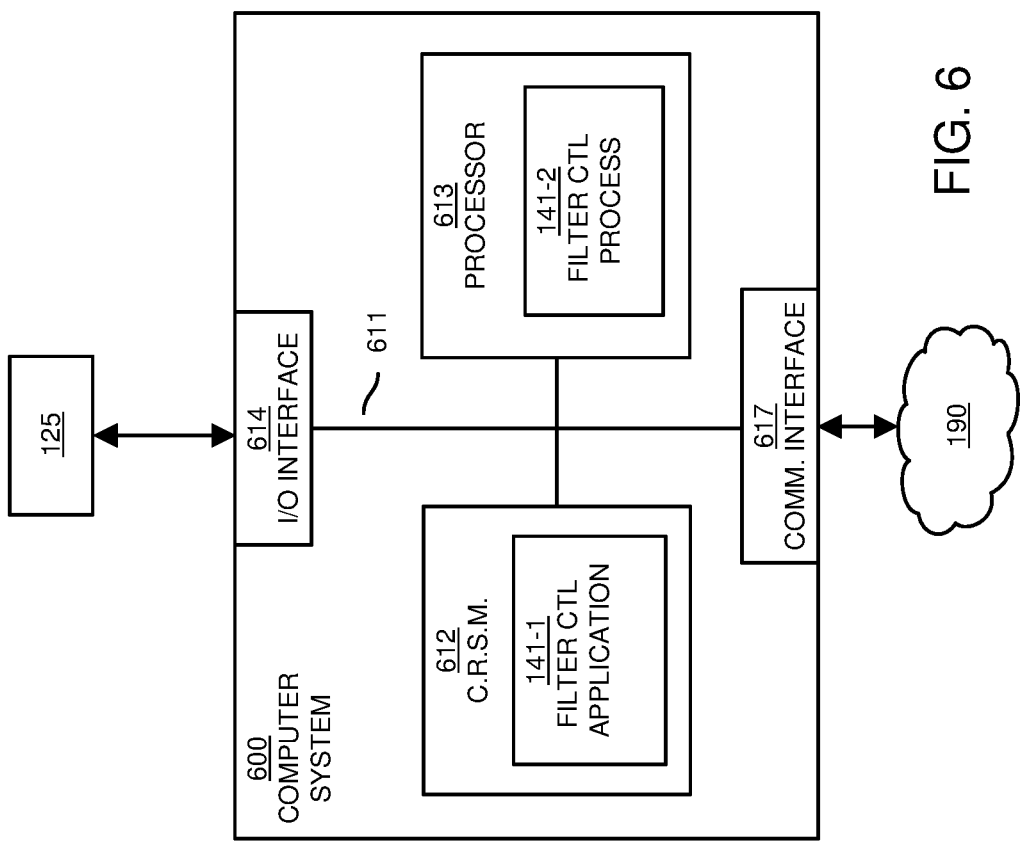
FIG. 6 is an example diagram illustrating computer processor hardware and related software instructions that execute methods according to embodiments herein.

FIG. 6 is an example block diagram of a computer device for implementing any of the operations as discussed herein according to embodiments herein.

As shown, computer system 600 (such as implemented by any of one or more resources such as filter controller 141, controller 140, current monitor 150, reference voltage generator 137, etc.) of the present example includes an interconnect 611 that couples computer readable storage media 612 such as a non-transitory type of media (or hardware storage media) in which digital information can be stored and retrieved, a processor 613 (e.g., computer processor hardware such as one or more processor devices), I/O interface 614, and a communications interface 617.

I/O interface 614 provides connectivity to any suitable circuitry such as one or more voltage converters 165, filter 125, etc.

Computer readable storage medium 612 can be any hardware storage resource or device such as memory, optical storage, hard drive, floppy disk, etc. In one embodiment, the computer readable storage medium 612 stores instructions and/or data used by the filter control application 141-1 to perform any of the operations as described herein. Further in this example embodiment, communications interface 617 enables the computer system 600 and processor 613 to communicate over a resource such as network 190 to retrieve information from remote sources and communicate with other computers.

As shown, computer readable storage media 612 is encoded with filter control application 141-1 (e.g., software, firmware, etc.) executed by processor 613. Filter control application 141-1 can be configured to include instructions to implement any of the operations as discussed herein.

During operation of one embodiment, processor 613 accesses computer readable storage media 612 via the use of interconnect 611 in order to launch, run, execute, interpret or otherwise perform the instructions in filter control application 141-1 stored on computer readable storage medium 612.

Execution of the filter control application 141-1 produces processing functionality such as filter control process 141-2 in processor 613. In other words, the filter control process 141-2 associated with processor 613 represents one or more aspects of executing filter control application 141-1 within or upon the processor 613 in the computer system 600.

In accordance with different embodiments, note that computer system 600 can be a micro-controller device, logic, hardware processor, hybrid analog/digital circuitry, etc., configured to control a power supply and perform any of the operations as described herein.

Functionality supported by the different resources will now be discussed via flowchart in FIG. 7. Note that the steps in the flowcharts below can be executed in any suitable order.

Figure 7:
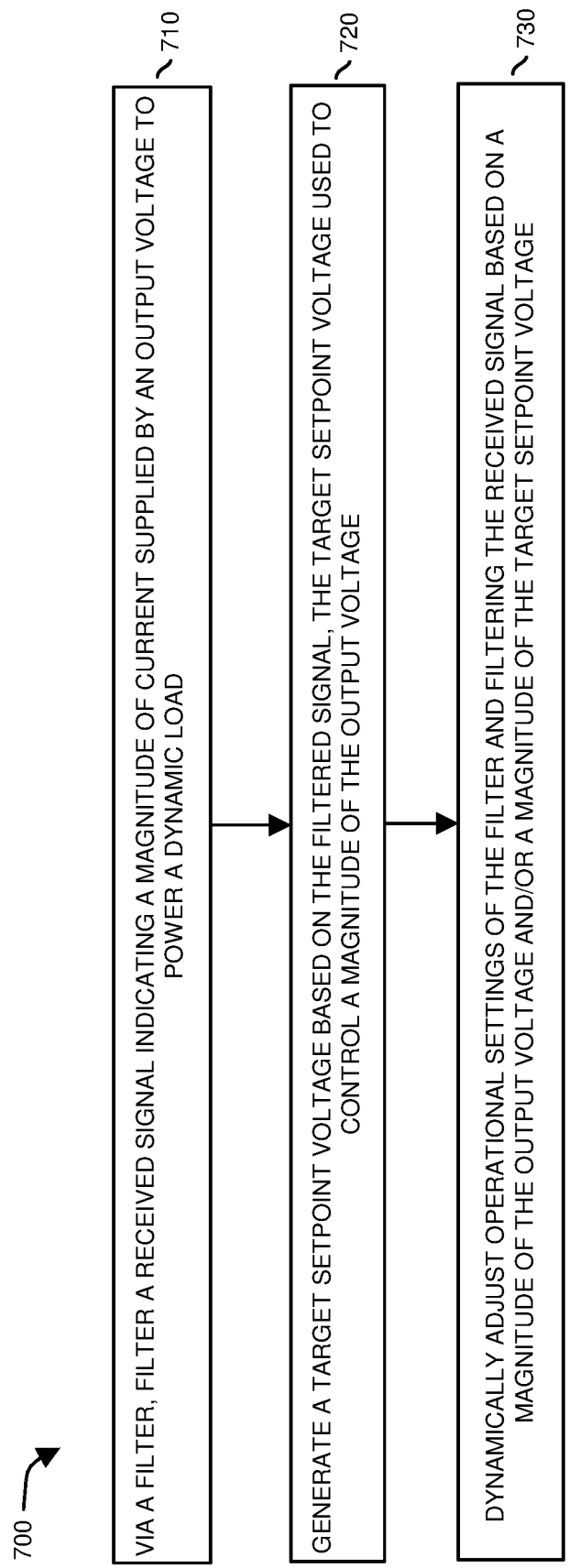
FIG. 7 is an example diagram illustrating a method according to embodiments herein.

FIG. 7 is an example diagram illustrating a method of controlling a power converter according to embodiments herein.

In processing operation 710, the power supply 100 implements filter 125 to filter a received signal 152 indicating a magnitude of current 122 (such as current through inductor 144) supplied by an output voltage 123 to power a dynamic load 118 and/or charge the capacitor 136.

In processing operation 720, the reference voltage generator 135 of the power supply 100 generates a target setpoint voltage 145 or Vt (a.k.a., V-target) based on the filtered signal 152-F. The target setpoint voltage Vt is used to control a magnitude of the output voltage 123 produced by the power supply 100.

In processing operation 730, the filter controller 141 dynamically adjusts operational settings of the filter 125 to filter the received signal 152 and produce the filtered signal generator 152-F.

Figure 8:
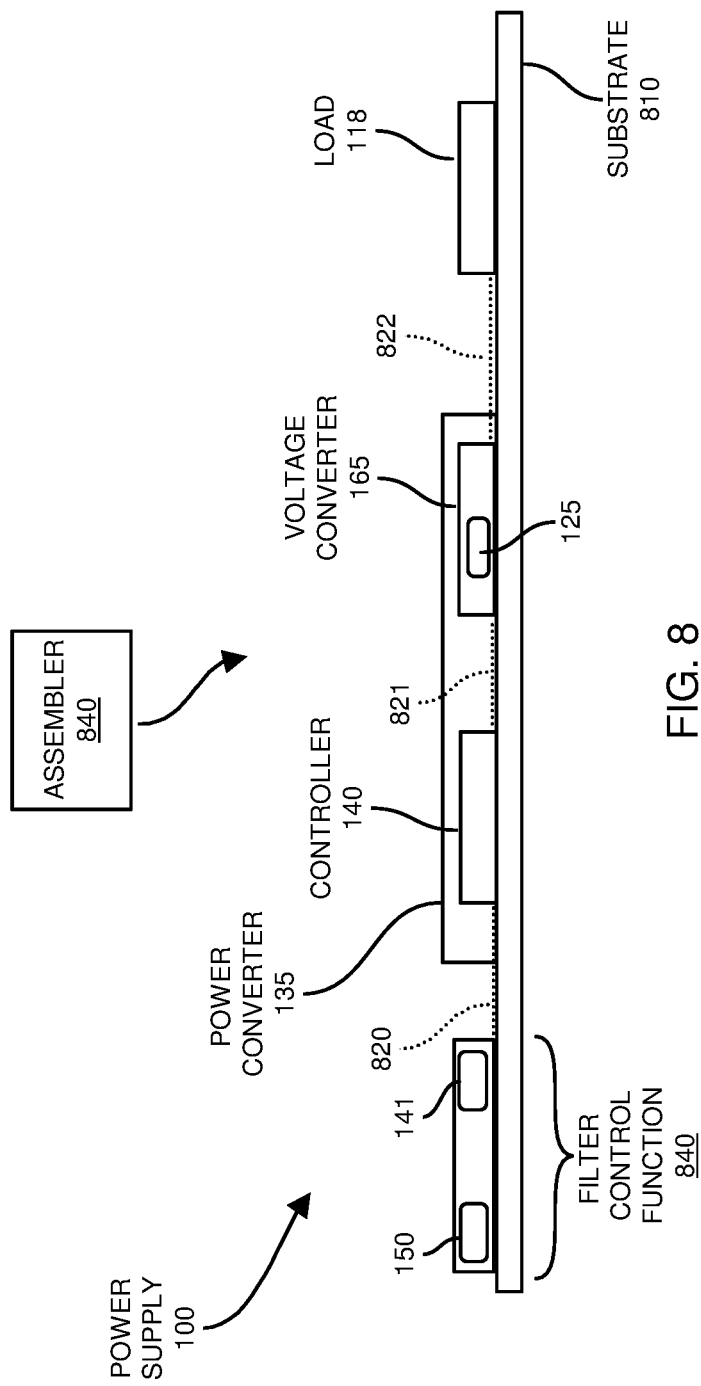
FIG. 8 is an example diagram illustrating assembly of a circuit according to embodiments herein.

FIG. 8 is an example diagram illustrating assembly of a power converter circuit on a circuit board according to embodiments herein.

In this example embodiment, assembler 840 receives substrate 810 (such as a circuit board).

The assembler 840 affixes (couples) the controller 140 and voltage converter 165 (and corresponding components associated with the power converter 135) to the substrate 810. The fabricator 840 also affixes the filter control function 840 and corresponding components (monitor 150, filter controller 141, etc.) to the substrate 810.

Via circuit paths 820 (such as one or more traces, electrical conductors, cables, wires, etc.), the assembler 840 couples the filter controller 141 to the power converter 135.

Via circuit paths 821 (such as one or more traces, electrical conductors, cables, wires, etc.), the assembler 840 couples the controller 140 to the voltage converter 165. Note that components such as the controller 140, voltage converter 165, and corresponding components such as filter control function 840, etc., associated with the power converter 135 can be affixed or coupled to the substrate 810 in any suitable manner. For example, one or more of the components in power supply 100 can be soldered to the substrate, inserted into sockets disposed on the substrate 810, etc.

Note further that the substrate 810 is optional. Circuit paths 820, 821, 822, etc., may be disposed in cables providing connectivity between the power converter 135 and the load 118.

In one nonlimiting example embodiment, the dynamic load 118 is disposed on its own substrate independent of substrate 810; the substrate of the dynamic load 118 is directly or indirectly connected to the substrate 810. The controller 140 or any portion of the power converter 135 can be disposed on a standalone smaller board plugged into a socket of the substrate 810.

In further example embodiments, via one or more circuit paths 822 (such as one or more traces, cables, connectors, wires, conductors, electrically conductive paths, etc.), the assembler 840 couples the voltage converter 165 to the load 118. In one embodiment, the circuit path 822 conveys the output voltage 123 (and output current 122) generated from the voltage converter 165 to the load 118.

Accordingly, embodiments herein include a system comprising: a substrate 810 (such as a circuit board, standalone board, mother board, standalone board destined to be coupled to a mother board, host, etc.); a voltage converter 165 including corresponding components as described herein; and a dynamic load 118. As previously discussed, the dynamic load 118 is powered based on conveyance of output voltage 123 and corresponding current 122 conveyed over one or more circuit paths 822 from the voltage converter 165 to the dynamic load 118 and one or more capacitors 136.

Note that the dynamic load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 810 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a filter to receive a signal indicating a magnitude of current supplied by an output voltage to power a dynamic load, the filter producing a filtered signal from the received signal;
   a reference voltage generator to generate a target setpoint voltage based on the filtered signal, the target setpoint voltage used to control a magnitude of the output voltage; and
   a filter controller to dynamically change operational settings of the filter based on the magnitude of the output voltage.

2. The apparatus as in claim 1, wherein the target setpoint voltage is selected by an adaptive voltage positioning function.

3. The apparatus as in claim 1, wherein the filter controller is operative to control the operational settings of the filter based on the magnitude of the output voltage and a magnitude of a VID (Voltage IDentification) value received from the dynamic load.

4. The apparatus as in claim 1, wherein the filter controller is operative to adjust the operational settings of the filter based on a change in a magnitude of a VID value.

5. The apparatus as in claim 1, wherein the filter controller includes a first comparator and a second comparator;
wherein the first comparator is operative to compare the magnitude of the output voltage to an output voltage threshold value; and
wherein the second comparator is operative to compare a magnitude of a VID value to a preset VID threshold value.

6. The apparatus as in claim 5, wherein the operational settings of the filter include a bandwidth of filtering the signal; and
wherein the filter controller is operative to reduce the bandwidth of filtering the signal in response to detecting that: i) the magnitude of the output voltage crosses the output voltage threshold value, and ii) the magnitude of the VID value crosses the preset VID threshold value.

7. The apparatus as in claim 1, wherein the filter is a low pass filter;
wherein the operational settings modified by the controller include a time constant of the low pass filter; and
wherein the controller is operative to increase a magnitude of the time constant of the low pass filter in response to the change in consumption of the current by the dynamic load.

8. The apparatus as in claim 1, wherein the filter controller is operative to reduce a rate at which the filtered signal changes over time.

9. The apparatus as in claim 1, wherein the reference voltage generator is operative to produce the target setpoint voltage based on a voltage identification value supplied by the dynamic load, the voltage identification value generated via implementation of an adaptive voltage positioning function.

10. The apparatus as in claim 8, wherein the target setpoint voltage, Vt, produced by the reference voltage generator equals:

$$VID - (IoutF * LL),$$

where VID=the voltage identification value,
IoutF=a magnitude of the filtered signal, and
LL=a Load-Line function associated with a voltage converter operative to convert the input voltage into the output voltage.

11. A method comprising:
implementing a filter to filter a received signal indicating a magnitude of current supplied by an output voltage to power a dynamic load;
generating a target setpoint voltage based on the filtered signal, the target setpoint voltage used to control a magnitude of the output voltage; and
dynamically changing operational settings of the filter filtering the received signal based on the magnitude of the output voltage.

12. The method as in claim 11 further comprising:
implementing an adaptive voltage positioning function to generate the target setpoint voltage.

13. The method as in claim 11, wherein dynamically changing operational settings of the filtering of the received signal includes:
controlling the operational settings of the filter based on the magnitude of the output voltage and a magnitude of a VID value received from the dynamic load.

14. The method as in claim 11, wherein dynamically changing operational settings of the filter filtering the received signal includes:
adjusting the operational settings of the filter based on a change in a magnitude of a VID value received from the dynamic load.

15. The method as in claim 11, wherein dynamically changing operational settings of the filter filtering the received signal includes:
via a first comparator, comparing the magnitude of the output voltage to an output voltage threshold value; and
via a second comparator, comparing a magnitude of a VID value to a preset VID threshold value.

16. The method as in claim 15, wherein the operational settings of the filter include a bandwidth of filtering the signal, the method further comprising:
reducing the bandwidth of filtering the signal in response to detecting that: i) the magnitude of the output voltage crosses the output voltage threshold value, and ii) the magnitude of the VID value crosses the preset VID threshold value.

17. The method as in claim 11, wherein the operational settings include a time constant of a low pass filter, the method further comprising:
increasing a magnitude of the time constant of the low pass filter in response to a change in a magnitude of the current supplied to the dynamic load.

18. The method as in claim 11 further comprising:
reducing a rate at which the filtered signal changes over time.

19. The method as in claim 11 further comprising:
producing the target setpoint voltage based on a voltage identification value supplied by the dynamic load, the voltage identification value generated via implementation of an adaptive voltage positioning function.

20. The method as in claim 19 further comprising:
producing the target setpoint voltage, Vt, to equal:

$$VID - (IoutF * LL),$$

where VID=the voltage identification value,
IoutF=a magnitude of the filtered signal, and
LL=a Load-Line function associated with a voltage converter operative to convert the input voltage into the output voltage.

21. Computer-readable storage media having instructions stored thereon, the instructions, when executed by computer processor hardware, cause the computer processor hardware to:
filter a received signal indicating a magnitude of current supplied by an output voltage to power a dynamic load;
generate a target setpoint voltage based on the filtered signal, the target setpoint voltage used to control a magnitude of the output voltage; and
dynamically change operational settings of the filtering the received signal based on the magnitude of the output voltage.

22. A system comprising:
a circuit substrate;
the apparatus of claim 1, the apparatus coupled to the circuit substrate; and
wherein the dynamic load is coupled to the substrate.

23. A method comprising:
receiving a circuit substrate; and
coupling the apparatus of claim 1 to the circuit substrate.

24. The apparatus as in claim 1, wherein the filter controller is operative to adjust the operational settings of the filter based on a detected change in the magnitude of the output voltage.

25. The apparatus as in claim 1, wherein the filter controller is operative to adjust the operational settings of the filter based on detecting that the magnitude of the output voltage crosses a threshold value.

26. The apparatus as in claim 1, wherein the change to the operational settings of the filter prevents the magnitude of the output voltage from falling below an output voltage threshold level.

27. The apparatus as in claim 1, wherein the target setpoint voltage equals Vt, and:

$$Vt = VID - (IoutF * LL),$$

where VID = a received voltage identification value,
   IoutF = a magnitude of the filtered signal produced by the filter, and
   LL = a Load-Line function associated with a voltage converter operative to convert the input voltage into the output voltage.

28. The apparatus as in claim 1, wherein operational settings modified by the controller include a time constant of the filter.

29. The apparatus as in claim 28, wherein the filter controller is operative to increase a magnitude of the time constant of the filter in response to detecting a change in the magnitude of the output voltage.

30. The apparatus as in claim 29, wherein the change in the magnitude of the output voltage occurs in response to adjustment of a setpoint voltage of regulating the output voltage.

31. The apparatus as in claim 1, wherein the operational settings of the filter include a bandwidth of filtering the signal; and wherein the filter controller is operative to reduce a bandwidth of filtering the signal in response to detecting that: i) the magnitude of the output voltage crosses an output voltage threshold value, and ii) the magnitude of a setpoint reference voltage of regulating the output voltage crosses a preset setpoint reference voltage threshold value.

32. The apparatus as in claim 1 further comprising a switch controller operative to regulate a magnitude of the output voltage based on the target setpoint voltage.

33. The apparatus as in claim 1, wherein the reference voltage generator is operative to transition the target setpoint voltage from a first output voltage regulation setpoint to a second output voltage regulation setpoint based on the filtered signal.

* * * * *